US011932014B2

(12) United States Patent
Linn et al.

(10) Patent No.: US 11,932,014 B2
(45) **Date of Patent: *Mar. 19, 2024**

(54) PRINT COMPONENT HAVING FLUIDIC ACTUATING STRUCTURES WITH DIFFERENT FLUIDIC ARCHITECTURES

(71) Applicant: Hewlett-Packard Development Company, L.P., Spring, TX (US)

(72) Inventors: Scott A. Linn, Corvallis, OR (US); James Michael Gardner, Corvallis, OR (US); John Rossi, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/139,106

(22) Filed: Apr. 25, 2023

(65) Prior Publication Data

US 2024/0009994 A1 Jan. 11, 2024

Related U.S. Application Data

(63) Continuation of application No. 17/859,188, filed on Jul. 7, 2022, now Pat. No. 11,667,116, which is a (Continued)

(51) Int. Cl.
*B41J 2/045* (2006.01)
*B41J 2/14* (2006.01)

(52) U.S. Cl.
CPC ......... *B41J 2/0458* (2013.01); *B41J 2/04585* (2013.01); *B41J 2002/14475* (2013.01)

(58) Field of Classification Search
CPC .. B41J 2/04536; B41J 2/0458; B41J 2/04585; B41J 2/04586; B41J 2002/14475
See application file for complete search history.

(56) References Cited

U.S. PATENT DOCUMENTS 6,257,690 B1 7/2001 Holstun
6,547,356 B2 * 4/2003 Edelen ................ B41J 2/04581 347/237

(Continued)

FOREIGN PATENT DOCUMENTS

CN 101261524 A 9/2008
CN 101522428 A 9/2009

(Continued)

*Primary Examiner* — Thinh H Nguyen
(74) *Attorney, Agent, or Firm* — Foley & Lardner LLP

(57) ABSTRACT

A print component includes an array of fluidic actuation structures including a first column of fluidic actuating structures addressable by a set of actuation addresses, each fluidic actuating structure having a different one of the actuation addresses and having a fluidic architecture type, and a second column of fluidic actuating structures addressable by the set of actuation addresses. Each fluidic actuating structure of the second column has a different one of the actuation addresses and has a same fluidic architecture type as the fluidic actuating structure of the first column having the same address. An address bus communicates the set of addresses to the array of fluidic actuating structures, and a fire signal line communicates a plurality of fire pulse signal types to the array of fluidic actuating structures, the fire pulse signal type depending on the actuation address on the address bus.

20 Claims, 10 Drawing Sheets

Related U.S. Application Data continuation of application No. 16/957,524, filed as application No. PCT/US2019/016889 on Feb. 6, 2019, now Pat. No. 11,413,862.

(56) References Cited

U.S. PATENT DOCUMENTS

| | | | | |
|---|---|---|---|---|
| 8,123,324 | B2 | 2/2012 | Komori et al. | |
| 8,449,058 | B2 | 5/2013 | Hasenbein | |
| 10,857,786 | B2 | 12/2020 | Korthuis et al. | |
| 11,667,116 | B2 * | 6/2023 | Linn | B41J 2/04543 347/40 |
| 2003/0202025 | A1 | 10/2003 | Schloeman et al. | |
| 2017/0239944 | A1 | 8/2017 | Martin et al. | |
| 2018/0083230 | A1 | 3/2018 | Harjee et al. | |

FOREIGN PATENT DOCUMENTS

| | | | |
|---|---|---|---|
| CN | 102307731 | A | 1/2012 |
| CN | 104875490 | A | 9/2015 |
| CN | 107206816 | A | 9/2017 |
| EP | 0765244 | A1 | 4/1997 |
| EP | 3281802 | A1 | 2/2018 |
| WO | 96/32289 | A1 | 10/1996 |
| WO | 2018/080480 | A1 | 5/2018 |
| WO | 2019/017951 | A1 | 1/2019 |

* cited by examiner

PRINT COMPONENT HAVING FLUIDIC ACTUATING STRUCTURES WITH DIFFERENT FLUIDIC ARCHITECTURES

CROSS-REFERENCE TO RELATED PATENT APPLICATIONS

This application is a Continuation of U.S. patent application Ser. No. 17/859,188, filed Jul. 7, 2022, which is a Continuation of U.S. patent application Ser. No. 16/957,524, filed Jun. 24, 2020, now U.S. Pat. No. 11,413,862, issued Aug. 16, 2022, which claims priority under U.S. National Stage Entry under 35 U.S.C. § 371 of International Patent Application No. PCT/US2019/016889, filed Feb. 6, 2019, the entireties of which are incorporated by reference herein.

BACKGROUND

Some print components may include an array of nozzles and/or pumps each including a fluid chamber and a fluid actuator, where the fluid actuator may be actuated to cause displacement of fluid within the chamber. Some example fluidic dies may be printheads, where the fluid may correspond to ink or print agents. Print components include printheads for 2D and 3D printing systems and/or other high pressure fluid dispensing systems.

Figure 1:
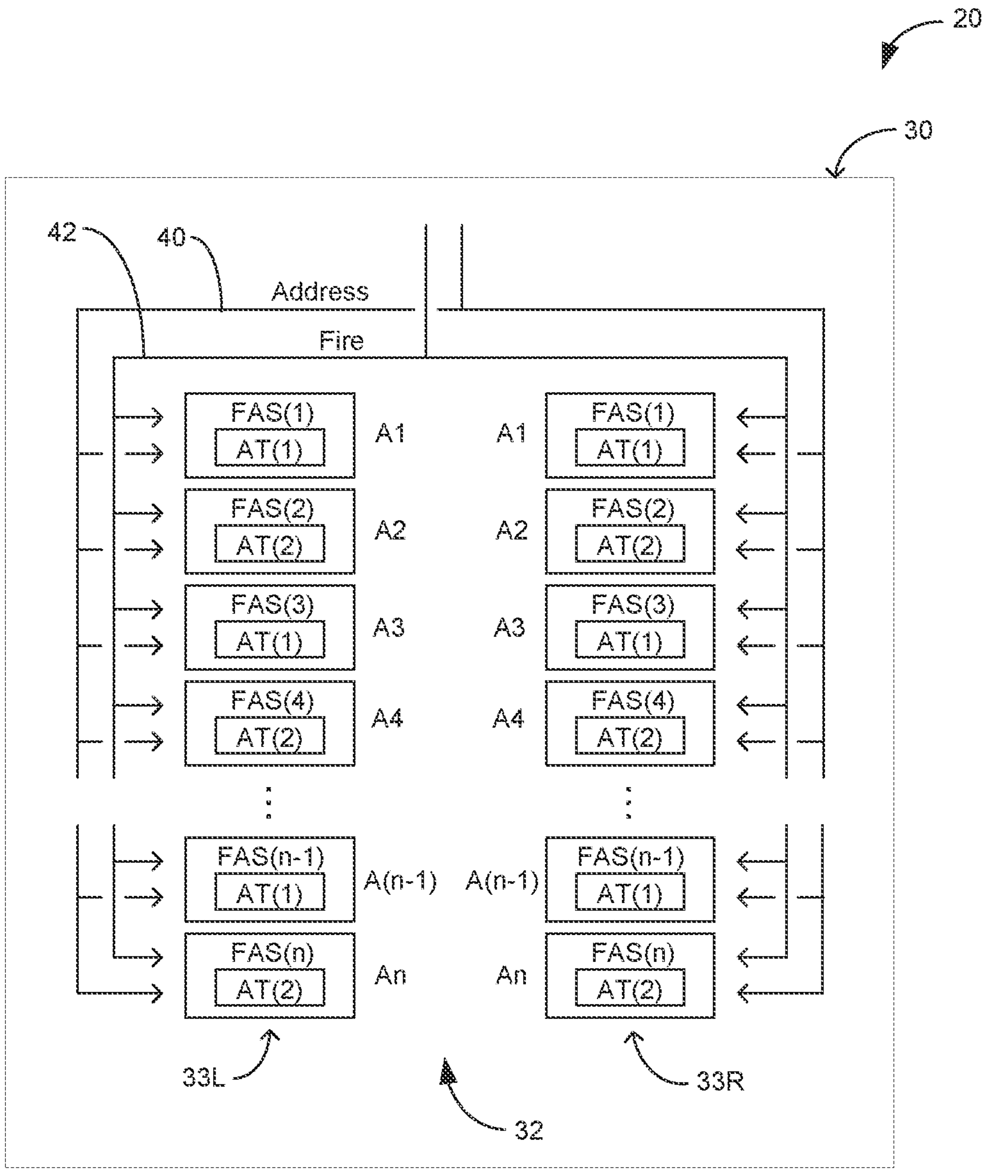
FIG. 1 is a block and schematic diagram illustrating an arrangement of fluidic actuating structures of a print component, according to one example.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Examples of print components, such as fluidic dies, for instance, may include fluid actuators. The fluid actuators may include thermal resistor based actuators (e.g., for firing or recirculating fluid), piezoelectric membrane based actuators, electrostatic membrane actuators, mechanical/impact driven membrane actuators, magneto-strictive drive actuators, or other suitable devices that may cause displacement of fluid in response to electrical actuation. Fluidic dies described herein may include a plurality of fluid actuators, which may be referred to as an array of fluid actuators. An actuation event may refer to singular or concurrent actuation of fluid actuators of the fluidic die to cause fluid displacement. An example of an actuation event is a fluid firing event whereby fluid is jetted through a nozzle orifice.

Example fluidic dies may include fluid chambers, orifices, fluidic channels, and/or other features which may be defined by surfaces fabricated in a substrate of the fluidic die by etching, microfabrication (e.g., photolithography), micromachining processes, or other suitable processes or combinations thereof. In some examples, fluidic channels may be microfluidic channels where, as used herein, a microfluidic channel may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Some example substrates may include silicon based substrates, glass based substrates, gallium arsenide based substrates, and/or other such suitable types of substrates for microfabricated devices and structures.

In example fluidic dies, a fluid actuator (e.g., a thermal resistor) may be implemented as part of a fluidic actuating structure, where such fluidic actuating structures include nozzle structures (sometimes referred to simply as "nozzles") and pump structures (sometimes referred to simply as "pumps"). When implemented as part of a nozzle structure, in addition to the fluid actuator, the nozzle structure includes a fluid chamber to hold fluid, and a nozzle orifice in fluidic communication with the fluid chamber. The fluid actuator is positioned relative to the fluid chamber such that actuation (e.g., firing) of the fluid actuator causes displacement of fluid within the fluid chamber which may cause ejection of a fluid drop from the fluid chamber via the nozzle orifice. In one example nozzle, the fluid actuator comprises a thermal actuator, where actuation of the fluid actuator (sometimes referred to as "firing") heats fluid within the corresponding fluid chamber to form a gaseous drive bubble that may cause a fluid drop to be ejected from the nozzle orifice.

When implemented as part of a pump structure, in addition to the fluid actuator, the pump structure includes a fluidic channel. The fluid actuator is positioned relative to a fluidic channel such that actuation of the fluid actuator generates fluid displacement in the fluid channel (e.g., a microfluidic channel) to thereby convey fluid within the fluidic die, such as between a fluid supply and a nozzle structure, for instance.

As described above, fluid actuators, and thus, the corresponding fluidic actuator structures, may be arranged in arrays (e.g., columns), where selective operation of fluid actuators of nozzle structures may cause ejection of fluid drops, and selective operation of fluid actuators of pump structures may cause conveyance of fluid within the fluidic die. In some examples, the array of fluidic actuating structures may be arranged in sets of fluidic actuating structures, where each such set of fluidic actuating structures may be referred to as a "primitive" or a "firing primitive." The number of fluidic actuating structures, and thus, the number of fluid actuators in a primitive, may be referred to as a size of the primitive.

In some examples, the set of fluidic actuating structures of each primitive are addressable using a same set of actuation addresses, with each fluidic actuating structure of a primitive and, thus, the corresponding fluid actuator, corresponding to a different actuation address of the set of actuation addresses. In examples, the address data representing the set of actuation addresses are communicated to each primitive via an address bus shared by each primitive. In some examples, in addition to the address bus, a fire pulse line communicates a fire pulse signal to each primitive, and each primitive receives actuation data (sometimes referred to as fire data, nozzle data, or primitive data) via a corresponding data line.

In some examples, during an actuation or firing event, for each primitive, based on a value of the actuation data communicated via the data line for the primitive, the fluidic actuator of the fluidic actuating structure corresponding to the address on the address will actuate (e.g., "fire") in response to the fire pulse signal, where an actuation duration (e.g., firing time) of the fluid actuator is controlled by the fire pulse signal (e.g., a waveform of the fire pulse).

In some cases, electrical and fluidic operating constraints of a fluidic die may limit which fluid actuators of each primitive may be actuated concurrently for a given actuation event. Arranging the fluid actuators and, thus, the fluid actuating structures, into primitives facilitates addressing and subsequent actuation of subsets of fluid actuators that may be concurrently actuated for a given actuation event in order to conform to such operating constraints.

To illustrate by way of example, if a fluidic die comprises four primitives, with each primitive including eight fluid actuating structures (with each fluid actuator structure corresponding to different address of a set of addresses 0 to 7), and where electrical and/or fluidic constraints limit actuation to one fluid actuator per primitive, the fluid actuators of a total of four fluid actuating structures (one from each primitive) may be concurrently actuated for a given actuation event. For example, for a first actuation event, the respective fluid actuator of each primitive corresponding to address "0" may be actuated. For a second actuation event, the respective fluid actuator of each primitive corresponding to address "5" may be actuated. As will be appreciated, such example is provided merely for illustration purposes, with fluidic dies contemplated herein may comprise more or fewer fluid actuators per primitive and more or fewer primitives per die.

In some cases, it may be desirable for different nozzles to provide fluid drops of different sizes (e.g., different weights). To achieve different drop sizes, different nozzle structures may employ different fluidic architecture types, where different fluidic architecture types have different combinations of features such as different fluid chamber sizes, different nozzle orifice sizes, and different fluid actuator sizes (e.g., larger and smaller thermal resistors), for instance. For example, a nozzle having a first fluidic architecture type for providing larger drops sizes may have a nozzle orifice size larger than a nozzle having a second fluidic architecture type for providing smaller drop sizes. In other examples, a nozzle for providing a larger drop size may have a fluidic architecture type having a fluid actuator with a smaller thermal resistor than nozzle having a fluidic architecture type employing a larger resistor for providing smaller drop sizes. It is noted that such examples are for illustrative purposes, and other fluidic architecture types are possible.

In addition to fluidic architecture types, the fire pulse may also be adjusted to adjust drop size (i.e., the fire pulse waveform may be adjusted). Some fluidic dies employ on-die fire pulse generation circuitry which may provide a same fire pulse for all drop sizes or may provide different fire pulse signal for different drop sizes. However, a same fire pulse signal for all drop sizes may not be optimal for any of the drop sizes, and on-die generation circuitry, particularly for multiple fire pulse signals, is complex and consumes a large amount of silicon area on the die.

According to examples of the present disclosure, an arrangement of fluidic actuating structures of different fluidic architecture types is described, which may include both nozzle structures and pump structures, that provides different drops sizes while enabling fire pulse generation to be performed off-die based on actuation addresses of the fluidic actuating structures.

FIG. 1 is a block and schematic diagram generally illustrating a print component 20, according to one example of the present disclosure. In one example, print component 20 is a fluidic die 30. In one example, fluid die 30 includes an array 32 of fluidic actuation structures having a first column of fluidic actuating structures 33L (e.g., a left column) and a second column of fluidic actuating structures 33R (e.g., a right column), with each column having a number of fluidic actuating structures, illustrated as fluidic actuating structures FAS(1) to FAS(n). In one example, each actuating structure FAS(1) to FAS(n) has a fluidic architecture type, AT, which is described in greater detail below (e.g., see FIG. 2). For illustrative purposes, in FIG. 1, fluidic actuating structures FAS(1) to FAS(n) of first and second columns 33L and 33R are shown as having one of two fluidic architecture types AT(1) and AT(2). In other examples, as will be described in greater detail below, more than two fluidic architecture types are possible.

In one example, the fluidic actuating structures FAS(1) to FAS(n) of each column 32L and 32R are addressable by a set of actuating addresses, illustrated as address A1 to An. According to examples of the present disclosure, each fluidic actuating structure FAS(1) to FAS(n) of second column 33R has a same architecture type, AT, as the fluidic actuating structure FAS(1) to FAS(n) of first column 33L having the same actuation address. For example, FAS(3) in second column 33R at actuation address A3 has the same fluid architecture type AT(1) as fluid actuating structure FAS(3) having the same actuation address A3 in first column 33L. Similarly, FAS(n) in second column 33R at actuation address An has the same fluid architecture type AT(2) as fluid actuating structure FAS(n) having the same actuation address An in first column 33L.

In one example, an address bus 40 communicates the set of actuation addresses A1 to An to first and second columns 33L and 33R of fluidic actuating structures FAS(1) to FAS(n) of array 32, and a fire signal line 42 communicates a fire pulse signal to the fluidic actuating structures FAS(1) to FAS(n) of first and second columns 33L and 33R array 32. In one example, each fluidic architecture type, AT, has a corresponding fire pulse signal type, with a particular fire pulse signal type being communicated on fire signal line 42 being based on the actuation address of the set of actuation addresses being communicated via address bus 40. As will be described in greater detail below (see FIG. 6), in one example, each fire pulse signal type has a different waveform.

As an illustrative example, in one case, fluidic architecture type AT(1) has a corresponding fire pulse signal type, FPS(1), associated with odd-numbered actuating addresses A1, A3 . . . A(n-1), and fluidic architecture type AT(2) has a corresponding fire pulse signal type, FPS(2), associated with even-numbered actuation addresses A2, A4 . . . A(n). Thus, as an illustrative example, if the actuation address being communicated on address bus 40 is one of the even-numbered addresses A2, A4, . . . An, fire pulse signal type, FPS(2) will be communicated via fire signal line 42.

Although illustrated above as having only two fluidic architect types, AT(1) and AT(2), in other examples, each fluidic actuating structure FAS(1) to FAS(n) of first column 33L may have a different fluidic architecture type, with FAS(1) to FAS(n) of first column 33L respectively having fluidic architecture types AT(1) to AT(n), so long as each of the fluidic actuating structures FAS(1) to FAS(n) of second column 33R has the same fluidic architecture type, AT, as the fluidic actuating structure having the same actuation address in first column 33L. In such case, fire signal line 42 may communicate a different fire pulse signal type, FPS(1) to FPS(n), for each fluidic architecture type AT(1) to AT(n) and, thus, communicate a different fire pulse signal type FPS(1) to FPS(n) for each actuation address A1 to An.

By arranging each fluidic actuating structure FAS(1) to FAS(n) of second column 33R of the array 32 to have a same fluidic architecture type, AT, as the fluidic actuating structure FAS(1) to FAS(n) of first column 33L having the same actuation address, a fire pulse signal type, FPS, can be provided on shared fire signal line 42 to first and second columns 33L and 33L which is based on the actuating address communicated via address bus 40, where such address indicates which of the fluidic actuating structure FAS(1) to FAS(n) are to be enabled to be actuated as part of an actuation event. Thus, the arrangement of the array 32 of the fluidic actuating structures of columns 33L and 33R enables different fire pulse signal types to be generated off-die based on an actuating address of fluidic actuating structures which are to be actuated during a given actuating event.

Figure 2:
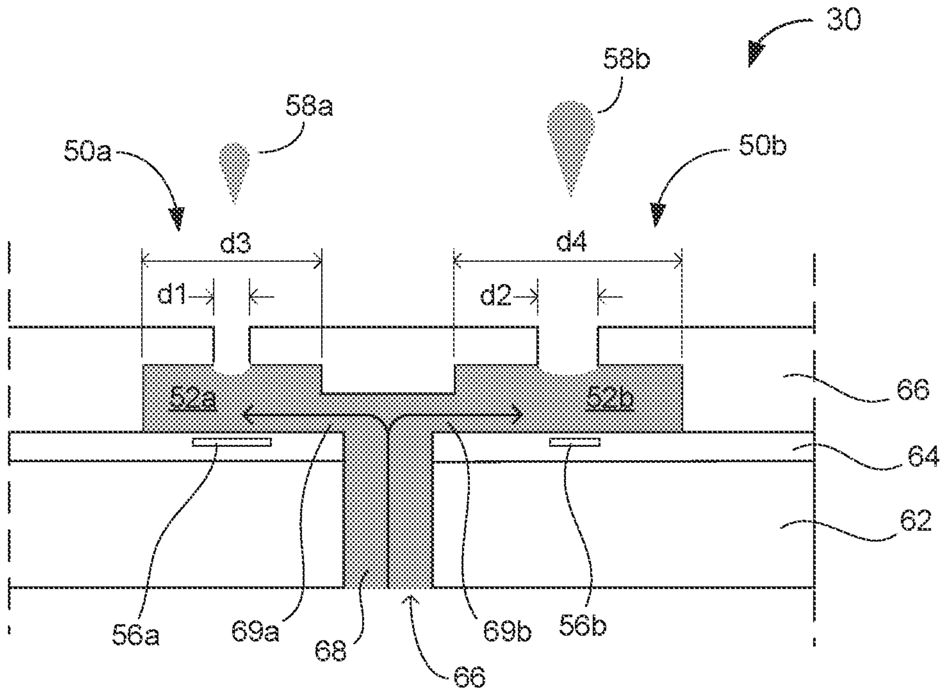
FIG. 2 is a schematic diagram generally illustrating a cross-sectional view of a portion of a print component, according to one example.

FIG. 2 is a cross-sectional view of fluidic die 30 generally illustrating example fluidic actuating structures, in particular, example a fluidic architectures of nozzle structures 50*a* and 50*b*, according to one example. In one example, fluidic die 30 includes a substrate 60 having a thin-film layer 62 disposed thereon, and an actuating structure layer 64 disposed on thin-film layer 62. In one example, thin-film layer 62 includes a plurality of structured metal wiring layers. In one example, actuating structure layer 64 comprises an SU-8 material.

In one example, each nozzle structure 50*a* and 50*b* respectively includes a fluid chamber 52*a* and 52*b* formed in actuating structure layer 64, with nozzle orifices 54*a* and 54*b* extending through actuating structure layer 64 to the respective fluid chambers 52*a* and 52*b*. In one example nozzle structure 50*a* and 50*b* includes a fluid actuator, such as thermal resistors 56*a* and 56*b* disposed in thin-film layer 62 below corresponding fluid chambers 52*a* and 52*b*. In one example, substrate 60 includes a plurality of fluid feed holes 66 to supply fluid 68 (e.g., ink) from a fluid source to fluid chambers 52*a* and 52*b* of nozzle structures 50*a* and 50*b*, such as via channels 69*a* and 69*b* (as illustrated by the arrows). According to one example, selective operation of nozzles 50*a* and 50*b*, such as through selective energization of thermal resistors 56*a* and 56*b*, as will be described in greater detail below, may vaporize a portion of fluid 68 in fluid chambers 52*a* and 52*b* to eject fluid drops 58*a* and 58*b* from respective nozzle orifices 54*a* and 54*b* during an actuation event.

As described above, the fluidic architecture types, AT, of nozzle structures, such as nozzle structures 50*a* and 50*b*, may vary in order to provide different fluid drop sizes, where sizes of features of fluid actuating structures, such as fluid chamber, nozzle orifices, and fluid actuators, may vary between different fluidic architecture types. For example, with reference to FIG. 2, nozzle 52*a* may have a first architecture type (e.g., AT(1)) to provide a first drop size, and nozzle 52*b* may have a second architecture type (e.g., AT(2)) to provide a second drop size larger than the first drop size, where sizes (e.g., diameters) d2 and d4 of nozzle orifice 52*b* and fluid chamber 54*b* of nozzle 50*b* are larger than diameters d1 and d3 of nozzle orifice 52*a* and fluid chamber 54*a* of nozzle 50*a*. In one example, thermal resistor 56*b* of nozzle 50*b* may be smaller (e.g., have a lower resistance/impedance value) than resistor 56*a* of nozzle 50*a*. In addition to sizes of fluid chambers, nozzle orifices, and fluid actuators, other features of fluidic actuating structures may be varied to provide any number of fluidic architecture types providing any number of fluid drop sizes (or circulate varying amounts of fluid in the case of a pump structure).

Figure 3:
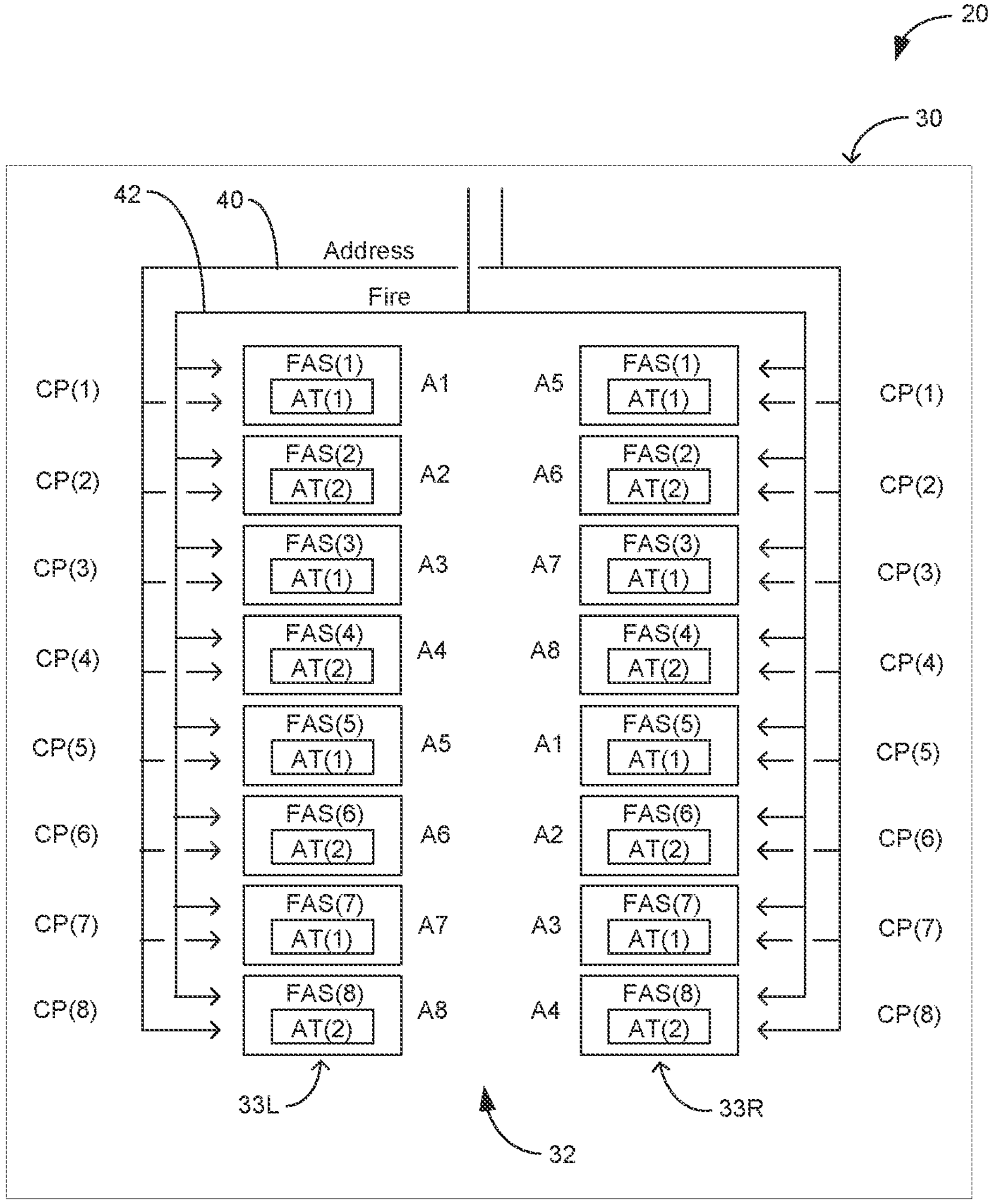
FIG. 3 is a block and schematic diagram illustrating an arrangement of fluidic actuating structures of a print component, according to one example.

FIG. 3 is block and schematic diagram generally illustrating fluid die 30, according to one example of the present disclosure. For purposes of illustration, first and second columns 33L and 33R of array 32 are each shown as having eight fluidic actuating structures FAS(1) to FAS(8). In the example of FIG. 3, each of the fluidic actuating structures FAS(1) to FAS(8) of each column 33L and 33R has one of two fluidic architecture types AT(1) and AT(2), and corresponds to one of a set of eight actuating addresses A1 to A8. In one example, as illustrated, each fluidic actuating structure corresponding to an odd numbered address (e.g., A1, A3, A5, and A7) has a first fluidic architecture type AT(1), and each fluidic actuating structure corresponding to an even number address (e.g., A2, A4, A6, and A8) has a second fluidic architecture type AT(2). In one example, fluidic architecture type AT(2) may provide a larger drop size relative to fluidic architecture type AT(1).

In one example, each column 33L and 33R has a number of column positions, illustrated as column positions CP(1) to CP(8), extending in a longitudinal direction of the columns, with each fluidic actuating structure FAS(1) to FAS(8) disposed at different one of the column positions. In the illustrated example, fluidic actuating structures FAS(1) to FAS(8) of columns 33L and 33R respectively correspond to column positions CP1 to CP(8).

In contrast to the example of FIG. 1, according to the example of FIG. 3, each of the fluidic actuating structures FAS(1) to FAS(8) of second column 33R are offset by number of column positions from the fluidic actuating structures FAS(1) to FAS(8) having the same address in first column 33L. In the example of FIG. 3, each fluidic actuating structure FAS(1) to FAS(8) in column 33R is offset by four column positions from the fluidic actuating structure FAS(1) to FAS(8) having the same address in column 33L.

For example, fluidic actuating structure FAS(1) of column 33L having address A1 at column position CP(1) is offset by four column positions from fluidic actuating structure FAS (5) of column 33R having address A1 at column position CP(5). While offset by a number of column positions, each of the fluidic actuating structures FAS(1) to FAS(8) of column 33R has the same fluidic architecture type as the fluidic actuating structures FAS(1) to FAS(8) of column 33L having the same actuating address. For instance, fluidic actuating structure FAS(5) of column 33R having actuation address A1 has a fluidic architecture type A(1) as does fluidic actuating structure FAS(1) of column 33L having actuation address A1.

In some examples, the fluidic actuating structures of FAS(1) to FAS(8) of each column 33L and 33R may be in close proximity to and receive fluid from a same fluid source (such as illustrated by FIG. 2). By offsetting fluidic actuating structures of columns 33L and 33R corresponding to a same address by a number of column positions, a chance of fluidic interference between such fluidic actuating structures, such as fluidic actuating structures FAS(1) of column 33L and FAS(5) of column 33R, is reduced and/or eliminated in a case where the fluidic actuator of each structure is concurrently actuated during an actuation event, where such fluid interference may, otherwise, adversely impact a quality of fluid drop ejected by such fluidic actuating structures.

In the example of FIG. 3, each fluidic actuating structure FAS(1) to FAS(8) of columns 33L and 33R having a same actuating address are offset by a same number of column positions. In particular, each of the fluidic actuating structures sharing a same actuating address are offset from one another by four column positions. In the example of FIG. 3, four is the maximum number of column positions by which each fluidic actuating structure having a same address can be offset from one another. In other examples, each fluidic actuating structure FAS(1) to FAS(8) of columns 33L and 33R having a same address may be offset from one another by two column positions. However, such offset may not be as effective at eliminating potential fluidic interference between such structures in the case of concurrent actuation.

In one example, to have a same offset between each pair of fluidic actuating structures FAS(1) to FAS(8) of columns 33L and 33R having a same actuation address, a quotient resulting from the division of the total number of fluidic actuating structures in a column by the total number of different fluidic architecture types must be an integer number (e.g., 8÷2=4, in the illustrated example). In example, a maximum offset is equal to one-half the number of fluidic actuating structures in a column, where the number of fluidic actuating structures in the column is an even number. In some examples, a same offset between fluidic actuating structures FAS(1) to FAS(8) of columns 33L and 33R may be less than the maximum possible offset.

Figure 4:
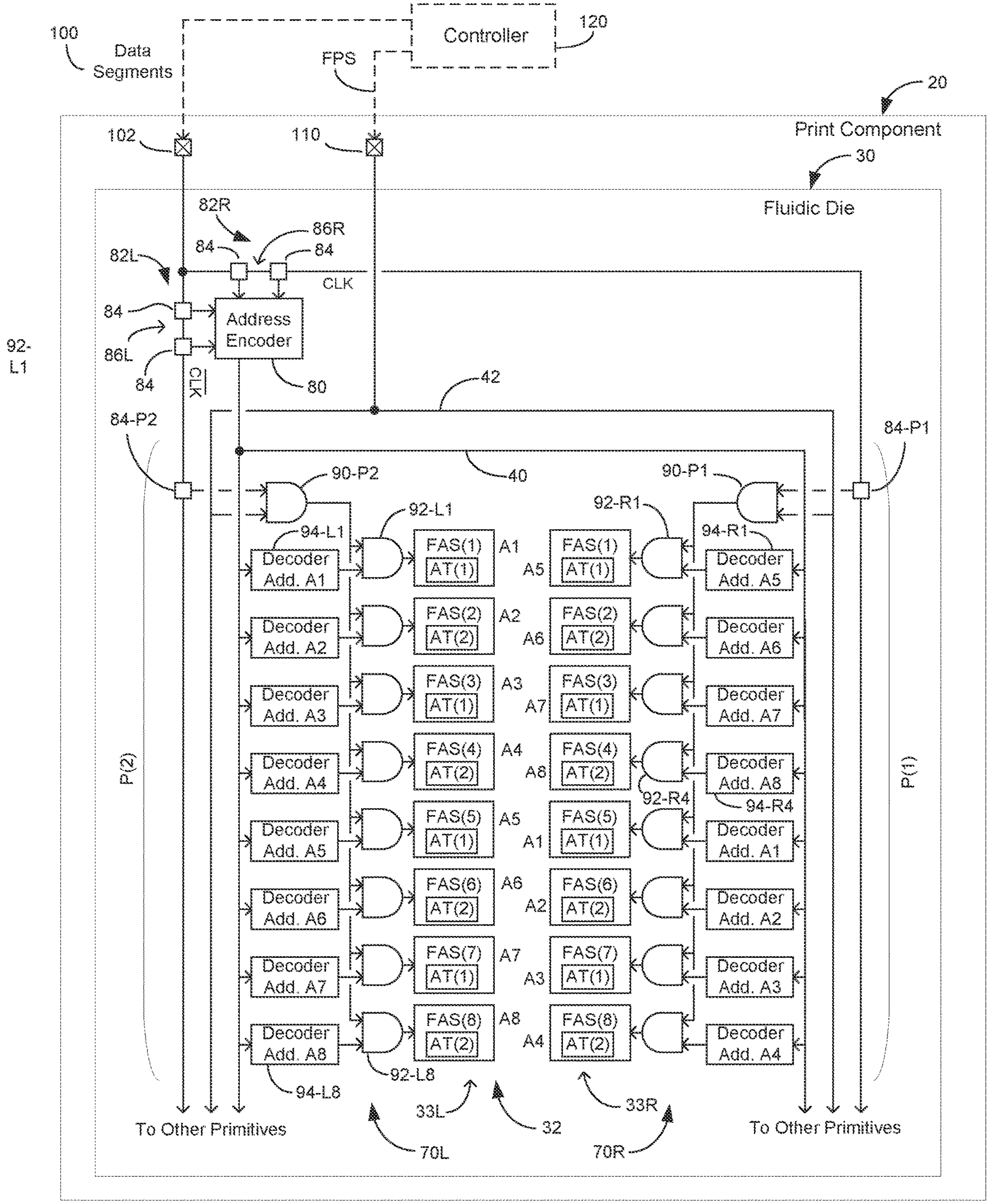
FIG. 4 is a block and schematic diagram illustrating an arrangement of fluidic actuating structures of a print component, according to one example.

FIG. 4 is a block and schematic diagram generally illustrating one example of fluidic die 30, where, in one instance, as illustrated, fluidic die 30 is part of print component 20. In one example, print component 20 may include multiple fluidic dies 30. In one example, each column 33L and 33R of fluidic actuating structures FAS(1) to FAS(8) of fluidic die 30, as illustrated by the example of FIG. 3, is arranged to form a primitive, respectively illustrated as primitives P(2) and P(1). In one example, fluidic die 30 includes a number of primitives, with primitives P(2) and P(1) respectively being part of first and second columns of primitives, indicated as primitive columns 70L and 70R.

In one example, fluidic die 30 includes an address decoder 80, and a chain 82 of individual memory elements 84 for each column of primitives 70L and 70R, respectively illustrated as memory element chains 82L and 82R. In one example, as illustrated, each chain of memory elements 82L and 82R includes a number of memory elements 84 corresponding to address encoder 80, as illustrated at 86L and 86R, and a memory element corresponding to each primitive P(2) and P(1), respectively illustrated as memory elements 84-P2 and 84-P1. In addition, each primitive, as illustrated by primitives P(1) and P(2), includes an AND-gate, as illustrated by AND-gates 90-P2 and 90-P1, and each fluidic actuating structure of each primitive has a corresponding AND-gate, such as illustrated by AND-gates 92-L1 and 92-R1, and a corresponding address decoder to decode the corresponding actuation address, such as illustrated by address encoders 94-L1 and 94-R1, respectively corresponding to fluidic actuating structures FAS(1) of primitives P(2) and P(1).

Figure 5:
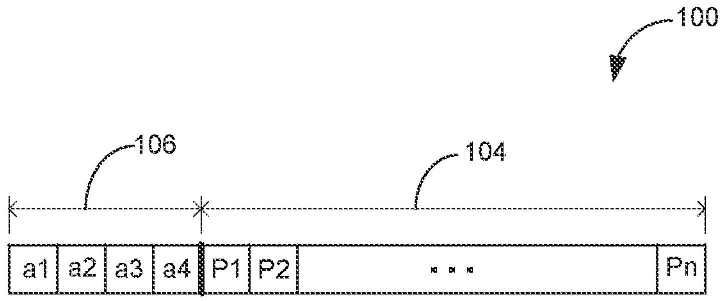
FIG. 5 is a schematic diagram illustrating a data segment, according to one example.

According to one example, in operation, print component 20 receives incoming data segments 100 at a data terminal 102, and incoming fire pulse signals (FPS) at a fire pulse terminal 110, such as from an external controller 120 (e.g., a controller of a printing system, for instance). FIG. 5 is a block and schematic diagram generally illustrating an example of data segment 100, where data segment 100 includes a first portion 104 including actuation data bits for each primitive of first and second primitive columns 70L and 70R, and a second portion 106 including a number of address bits, a1 to a4, representative of an actuation address of the set of actuation addresses (e.g., actuation addresses A1 to A8 in FIG. 4), where the actuation data bit in first portion 104 represents actuation data for the fluidic actuating structure, FAS, in each primitive corresponding to the actuation address represented by the address bits of second portion 106.

Figure 6:
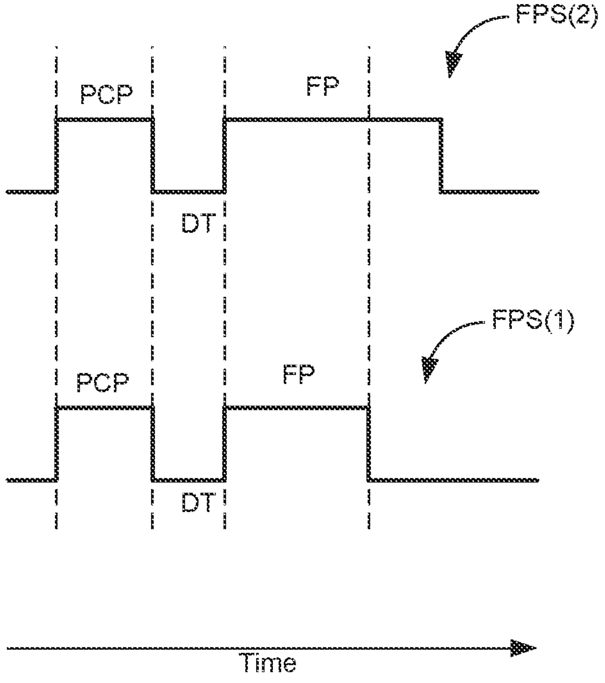
FIG. 6 is a schematic diagram generally illustrating example fire pulse signals.

FIG. 6 is a schematic diagram illustrating examples of fire pulse signal types, such as fire pulse signal type FPS(1) for first fluidic architecture type AT(1), and fire pulse signal type FPS(2) for second fluidic architecture type AT(2), for instance. As illustrated, each fire pulse signal type FPS(1) and FPS(2) has a waveform including precursor pulse (PCP), as respectively indicated at 112-1 and 112-2, a fire pulse (FP), as respectively indicated at 114-1 and 114-2, and a "dead time" (DT) between the PCP and the FP, as respectively indicated at 116-1 and 116-2.

As described above, and as is illustrated in greater detail below, a duration of an actuation time of a fluid actuator, such as a thermal resistor (e.g., thermal resistors 56*a* and 56*b* of FIG. 2), is controlled by the fire pulse signal, FPS. For example, when the fire pulse signal is raised, such as during the PCP (e.g., at 112-1 and 112-2) and during the FP (e.g., at 114-1 and 114-2), the fluid actuator will be energized. In the case of the fluid actuator being a thermal resistor (e.g., thermal resistors 56*a* and 56*b* of FIG. 2), a duration of a PCP is sufficient to energize the thermal resistor to heat fluid within a corresponding fluid chamber, but not sufficient to cause vaporization of fluid within the corresponding fluid chamber to cause a fluid drop to be ejected, while a duration of a FP is sufficient to energize the thermal resistor to cause ejection of a fluid drop from the corresponding fluid chamber (e.g., see FIG. 2).

By adjusting the durations of the PCP, DT, and FP, the waveform of a fire pulse signal may be adjusted to adjust amount of energy supplied to the fluid by the fluid actuator to thereby adjust a size of an ejected fluid drop. In one example, a unique FPS type may be provided for each fluidic architecture type, AT, by adjusting a duration of one or more of the PCP, DT, and FP to optimize a size of a fluidic drop ejected by each fluidic architecture type. For example, with reference to FIG. 6, FP 114-2 of FPS(2) for fluidic architecture type AT(2) has a longer duration than FP 114-1 of FPS(1) corresponding to fluidic architecture type AT(1). In one example, FPS(2) is configured to optimize a larger fluidic drop size provided by architecture type AT(2), while FPS(1) is configured to optimize a smaller drop size provided by architecture type AT(1).

Returning to FIG. 4, according to one example, during a given actuation event, fluidic die 30 serially receives data segment 100 via terminal 102. In one example, the bits of data segment 100 are serially loaded in an alternating fashion (e.g., based on rising edges and falling edges of a clock signal) into the chains of memory elements 82L and 82R corresponding to left-hand and right-hand columns of primitives 70L and 70R, such that data bits P2 and P1 of first portion 104 of data segment 100 are respectively loaded into memory elements 84-P2 and 84-P1, and address bits of second portion 106 of data segment 100 are loaded into memory elements 86L and 86R corresponding to address encoder 80. Subsequently, address encoder 80 drives the actuation address represented by the address bits loaded into memory elements 86L and 86R onto address bus 40.

According to the illustrative example of FIG. 4, if the actuation address represented by the address bits in second portion 106 of data segment 100 represents an odd-numbered address (e.g., A1, A3, A5, and A7), the FPS received at terminal 100 from external controller 120 and placed on fire signal line 42 will be FPS(1), and will be FPS(2) if the address is an even-numbered address (e.g., A2, A4, A6, and A8). If the actuation data loaded into each of the memory elements 84-P2 and 84-P1 is indicative of actuation (e.g., have a logic "high" state, such as a value of "1"), AND gates 90-P2 and 90-P1 respectively provide the FPS on fire signal line 42 to the AND-gates of each fluidic actuating structure FAS(1) to FAS(8) of primitives P2 and P1, such as illustrated by AND gates 92-L1 and 92-R1. Conversely, if the actuation data loaded into each of the memory elements 84-P2 and 84-P1 is not indicative of actuation (e.g., have a logic "low" state, such as a value of "0"), AND gates 90-P2 and 90-P1 will not pass the FPS on fire signal line 42 to primitives P2 and P1.

As an illustrative example, if the actuation address on address bus 40 corresponds to address A8, and AND-gates 90-P2 and 90-P1 have each passed FPS(2) on fire signal line 42 to primitives P2 and P1 (e.g., the actuation data in memory elements 84-P2 and 84-P1 has a logic "high"), address decoders 94-R4 and 94-L8 will each output a logic "high" to the corresponding AND-gates 92-R4 and 92-L8 which, in turn, provide FPS(2) at their outputs to respectively actuate the fluid actuators of FAS(4) of primitive P(1) and FAS(8) of primitive P(2), each of which have fluidic architecture type AT(2).

In view of the above, by arranging primitives P(1) and P(2) so that fluidic actuating structures, FAS, having a same address in each primitive have a same fluidic architecture type, AT, and by offsetting such fluidic actuating structures by a number of column positions (in the illustrative example, FAS(8) of primitive P(2) and FAS(4) of primitive P(1), both corresponding to actuation address A8, are offset by four column positions), a same fire pulse signal type, FPS, based on the actuation address, can be provided to primitives P(1) and P(2) without an occurrence of fluid interference between concurrently actuating fluid actuating structures. Such an arrangement enables fire pulse signals of different types to be generated off-die based, where the fire pulse signal type is based on the actuation address associated with the particular actuating event.

Figure 7:
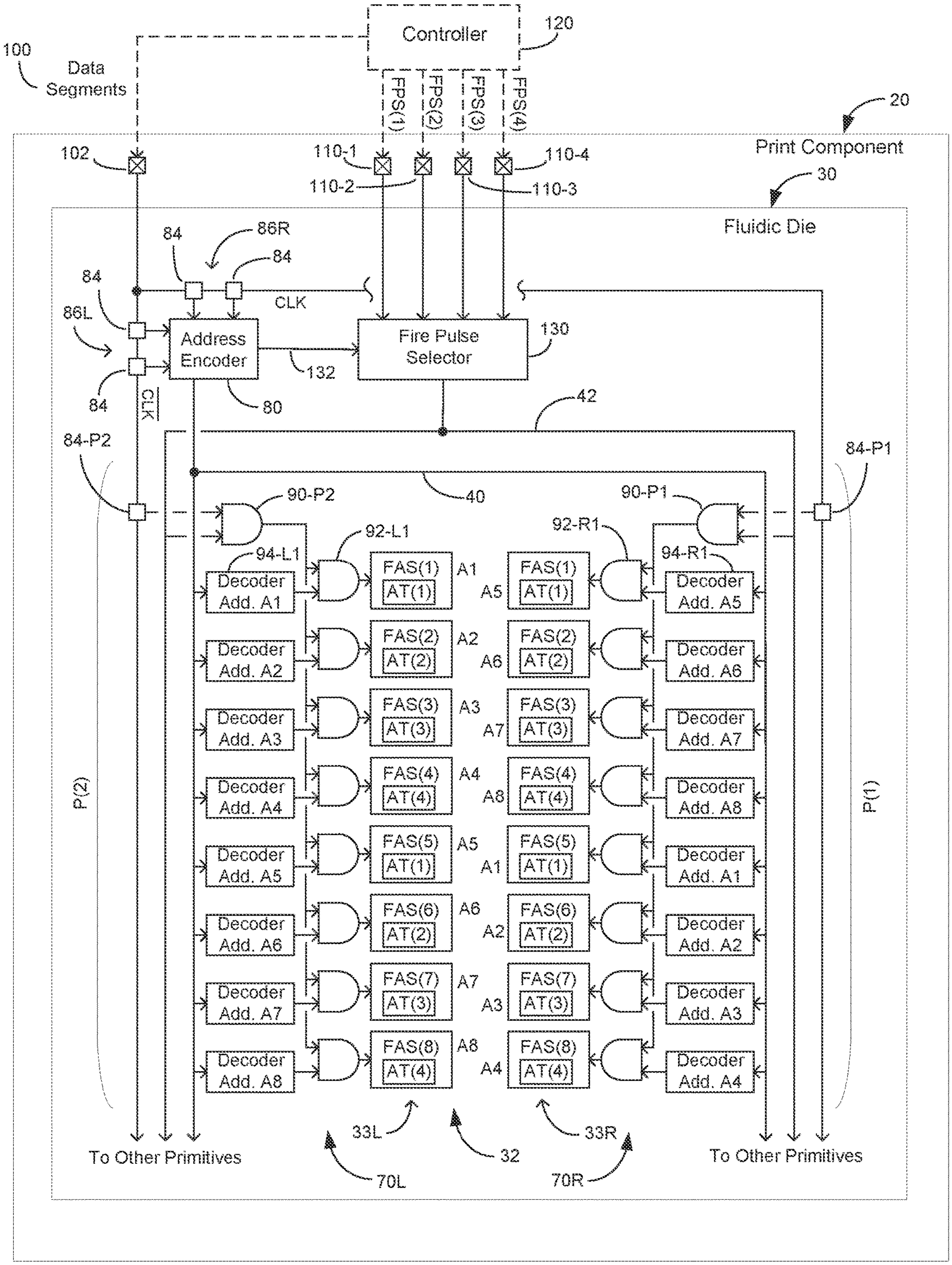
FIG. 7 is a block and schematic diagram illustrating an arrangement of fluidic actuating structures of a print component, according to one example.

FIG. 7 is a block and schematic diagram illustrating one example of fluid die 30, in accordance with the present disclosure. The example of FIG. 7 is similar to that of FIG. 4, but the fluidic actuating structures FAS(1) to FAS(8) of primitives P(1) and P(2) of FIG. 7 employ four fluidic architecture types, AT(1) to At(4), with actuating addresses A1 and A5 corresponding to fluidic architecture type AT(1), actuating addresses A2 and A6 corresponding to fluidic architecture type AT(2), actuating addresses A3 and A7 corresponding to fluidic architecture type AT(3), and actuating addresses A4 and A8 corresponding to fluidic architecture type AT(4).

Additionally, according to the implementation of FIG. 7, fluid die 30 includes a fire pulse selector 130 which concurrently receives four fire pulse signals types, FPS(1) through FPS(4), via fire pulse terminals 110-1 through 110-4 of print component 20, with each fire pulse signal type FPS(1) to FPS(4) respectively corresponding to fluidic architecture types At(1) to AT(4). Accordingly, in the illustrative example of FIG. 7, FPS(1) corresponds to actuation addresses A1 and A5, FPS(2) corresponds to actuation addresses A2 and A6, FPS(3) corresponds to actuation addresses A3 to A7, and FPS(4) corresponds to actuation addresses A4 and A8.

Figure 10:
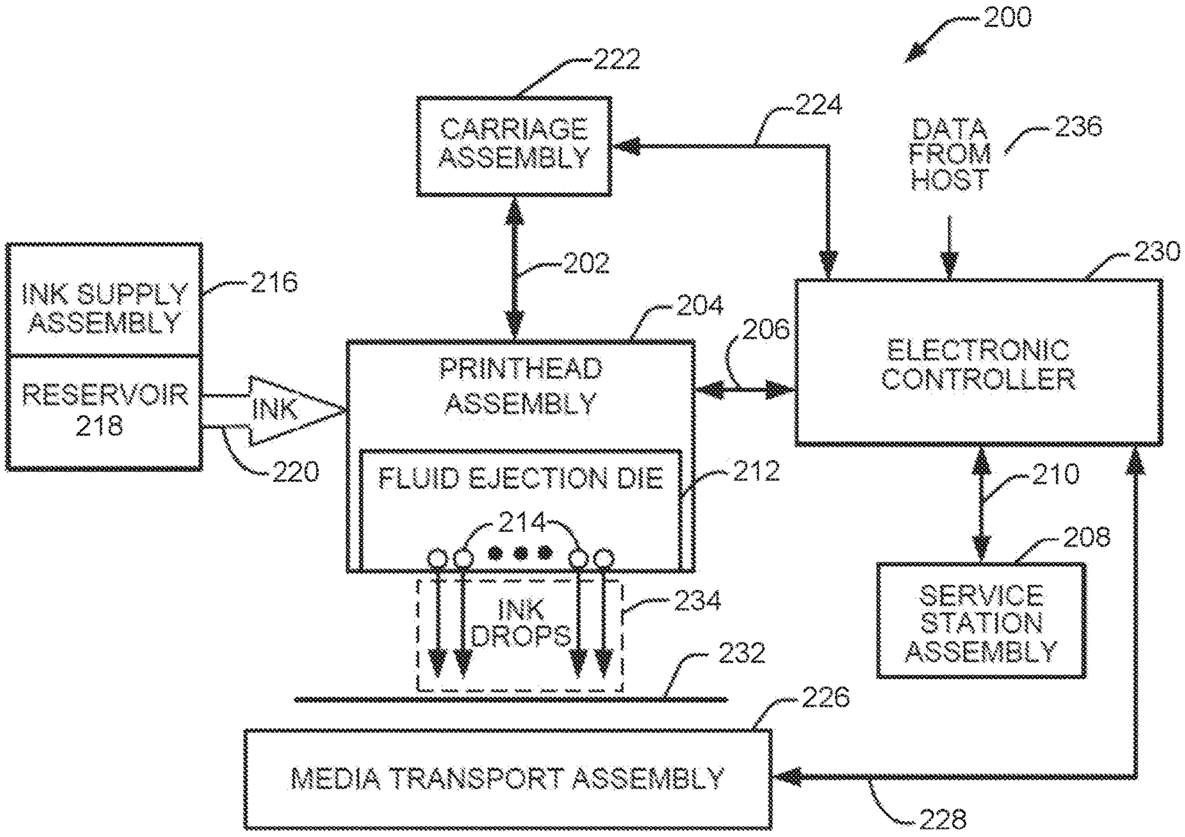
FIG. 10 is a block and schematic diagram illustrating a printing system, according to one example.

In operation, upon receiving incoming data segment 100 from external controller 120 (e.g., a controller of a printing system, such as illustrated by FIG. 10), address encoder 80 encodes onto address bus 40 the actuation address represented by the address data bits of second portions 106 of data segment 100 (see FIG. 5), as stored by memory elements 86L and 86R. Address encoder 80 also provides the actuation address to fire pulse selector 130 via a communication path 132. In one example, fire pulse selector 130 provides to fire signal line 42 the fire pulse signal of fire pulse signals FPS(1) to FPS(4) which corresponds to the actuation address received via communication path 132. For instance, if the actuation address corresponds to actuation address A3 or A7, fire pulse selector 130 places fire pulse FPS(3) on fire signal line 42. Similarly, if the actuation address corresponds to actuation address A2 or A6, fire pulse selection 130 places fire pulse FPS(2) on fire signal line 42.

Figure 8:
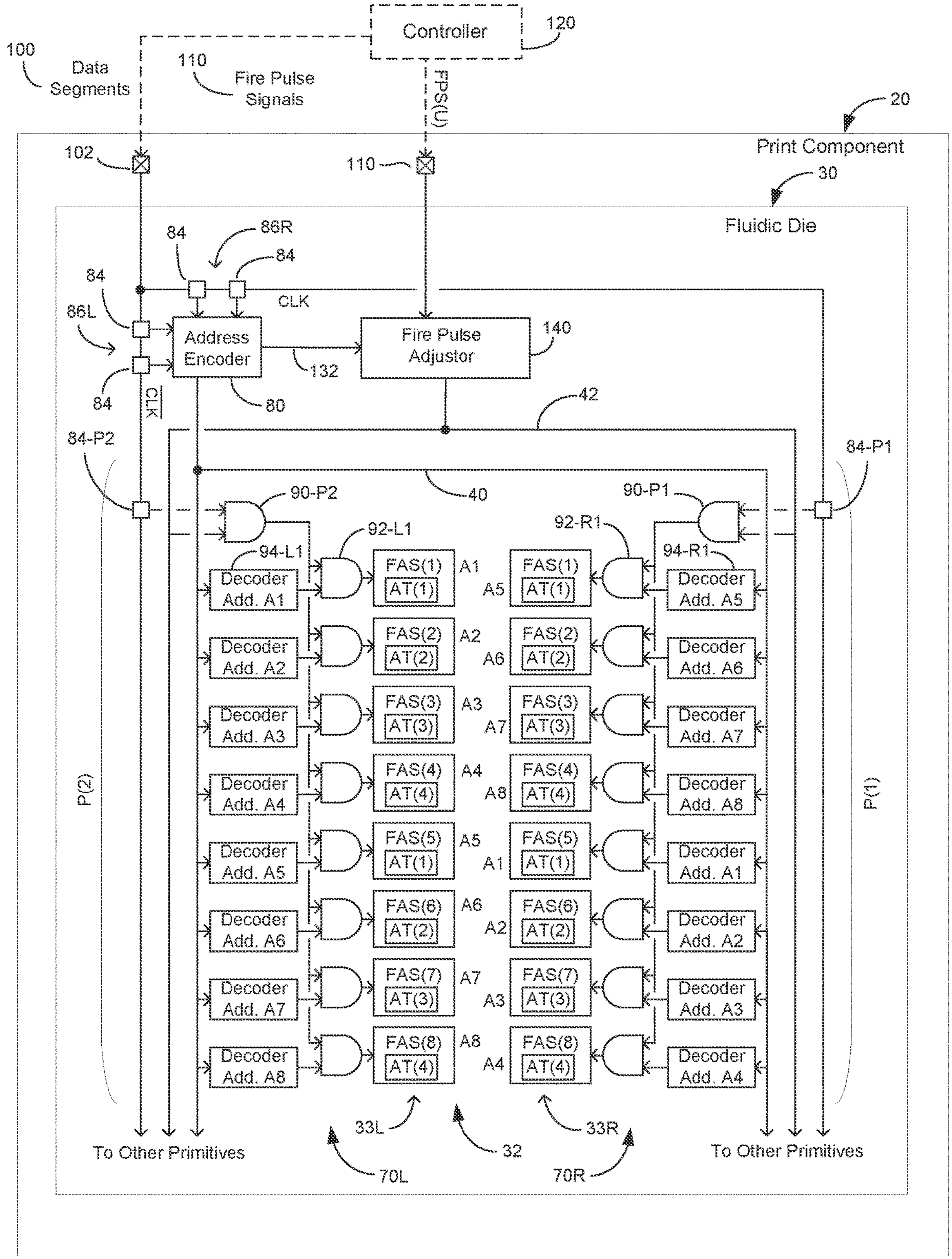
FIG. 8 is a block and schematic diagram illustrating an arrangement of fluidic actuating structures of a print component, according to one example.

FIG. 8 is a block and schematic diagram illustrating fluid die 30, in accordance with one example of the present disclosure. According to the example implementation of FIG. 8, fluidic die 30 includes a fire pulse adjuster 140 to receive a base fire pulse signal FPS(B) from external controller 120 via fire pulse terminal 110 of print component 20.

Figure 9:
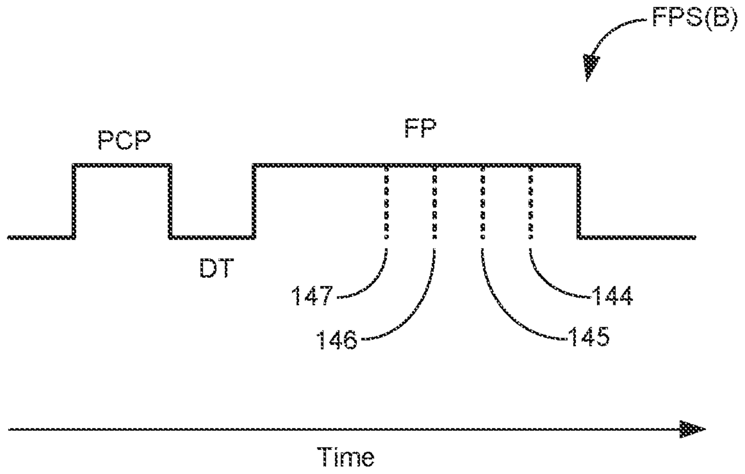
FIG. 9 is a schematic diagram generally illustrating an example fire pulse signal.

FIG. 9 is a schematic diagram generally illustrating a base fire pulse signal FPS(B), according to one example. In operation, according to one example, upon receiving an incoming data segment 100 from external controller 120 (e.g., a controller of a printing system, such as illustrated by FIG. 10), address encoder 80 encodes onto address bus 40 the actuation address represented by the address data bits of second portions 106 of data segment 100 (see FIG. 5), as stored by memory elements 86L and 86R. Address encoder 80 also provides the actuation address to fire pulse adjuster 140 via a communication path 142.

In one example, fire pulse adjust 140 truncates the trailing edge of the FP of the base fire pulse signal FPS(B) based on the actuation address received via communication path 142 to provide a fire pulse signal type on fire signal line which corresponds to the fluidic architecture type, AT, of the fluidic actuating structure, FAS, corresponding to the actuation address. For instance, according to one example, fire pulse adjuster 140 truncates the FP portion of base fire pulse signal FPS(B) at dashed line 144 to provide FPS(4) for architecture type AT(4) corresponding to actuation addresses A4 and A8, truncates the FP portion of base fire pulse signal FPS(B) at dashed line 145 to provide FPS(3) for architecture type AT(3) corresponding to actuation addresses A3 and A7, truncates the FP portion of FPS(B) at dashed line 146 to provide FPS(2) for architecture type AT(2) corresponding to actuation address A2 and A6, and truncates the FP portion of FPS(B) at dashed line 147 to provide FPS(1) for architecture type AT(1) corresponding to actuation addresses A1 and A5.

Although illustrated by the above examples primarily in terms of primitives having eight fluidic actuating structures, FAS(1) to FAS(8), and in terms of two or four fluidic architectures types, AT(1) to AT(4), primitives having more than eight fluidic actuating structures may be employed, and more than four fluidic architecture types may be employed. For instance, primitives having 16 fluidic actuating structures may be employed, where each fluidic actuating structure has its own fluidic architecture type (i.e., 16 fluidic architecture types), wherein each fluidic actuating structure has its own respective fire pulse signal type (e.g., as generated by external controller 120).

FIG. 10 is a block diagram illustrating one example of a fluid ejection system 200. Fluid ejection system 200 includes a fluid ejection assembly, such as printhead assembly 204, and a fluid supply assembly, such as ink supply assembly 216. In the illustrated example, fluid ejection system 200 also includes a service station assembly 208, a carriage assembly 222, a print media transport assembly 226, and an electronic controller 230, where electronic controller 230 may comprise controller 120 as illustrated by FIGS. 4, 7, and 8, for instance. While the following description provides examples of systems and assemblies for fluid handling with regard to ink, the disclosed systems and assemblies are also applicable to the handling of fluids other than ink.

Printhead assembly 204 includes at least one printhead 212 which ejects drops of ink or fluid through a plurality of orifices or nozzles 214, where printhead 212 may be implemented, in one example, as print component 20, or as fluidic die 30, with fluidic actuation structures FAS(1) to FAS(n), as previously described by FIGS. 1 and 2 herein, implemented as nozzles 214, for instance. In one example, the drops are directed toward a medium, such as print media 232, so as to print onto print media 232. In one example, print media 232 includes any type of suitable sheet material, such as paper, card stock, transparencies, Mylar, fabric, and the like. In another example, print media 232 includes media for three-dimensional (3D) printing, such as a powder bed, or media for bioprinting and/or drug discovery testing, such as a reservoir or container. In one example, nozzles 214 are arranged in at least one column or array such that properly sequenced ejection of ink from nozzles 214 causes characters, symbols, and/or other graphics or images to be printed upon print media 232 as printhead assembly 204 and print media 232 are moved relative to each other.

Ink supply assembly 216 supplies ink to printhead assembly 204 and includes a reservoir 218 for storing ink. As such, in one example, ink flows from reservoir 218 to printhead assembly 204. In one example, printhead assembly 204 and ink supply assembly 216 are housed together in an inkjet or fluid-jet print cartridge or pen. In another example, ink supply assembly 216 is separate from printhead assembly 204 and supplies ink to printhead assembly 204 through an interface connection 220, such as a supply tube and/or valve.

Carriage assembly 222 positions printhead assembly 204 relative to print media transport assembly 226, and print media transport assembly 226 positions print media 232 relative to printhead assembly 204. Thus, a print zone 234 is defined adjacent to nozzles 214 in an area between printhead assembly 204 and print media 232. In one example, printhead assembly 204 is a scanning type printhead assembly such that carriage assembly 222 moves printhead assembly 204 relative to print media transport assembly 226. In another example, printhead assembly 204 is a non-scanning type printhead assembly such that carriage assembly 222 fixes printhead assembly 204 at a prescribed position relative to print media transport assembly 226.

Service station assembly 208 provides for spitting, wiping, capping, and/or priming of printhead assembly 204 to maintain the functionality of printhead assembly 204 and, more specifically, nozzles 214. For example, service station assembly 208 may include a rubber blade or wiper which is periodically passed over printhead assembly 204 to wipe and clean nozzles 214 of excess ink. In addition, service station assembly 208 may include a cap that covers printhead assembly 204 to protect nozzles 214 from drying out during periods of non-use. In addition, service station assembly 208 may include a spittoon into which printhead assembly 204 ejects ink during spits to ensure that reservoir 218 maintains an appropriate level of pressure and fluidity, and to ensure that nozzles 214 do not clog or weep. Functions of service station assembly 208 may include relative motion between service station assembly 208 and printhead assembly 204.

Electronic controller 230 communicates with printhead assembly 204 through a communication path 206, service station assembly 208 through a communication path 210, carriage assembly 222 through a communication path 224, and print media transport assembly 226 through a communication path 228. In one example, when printhead assembly 204 is mounted in carriage assembly 222, electronic controller 230 and printhead assembly 204 may communicate via carriage assembly 222 through a communication path 202. Electronic controller 230 may also communicate with ink supply assembly 216 such that, in one implementation, a new (or used) ink supply may be detected.

Electronic controller 230 receives data 236 from a host system, such as a computer, and may include memory for temporarily storing data 236. Data 236 may be sent to fluid ejection system 200 along an electronic, infrared, optical or other information transfer path. Data 236 represents, for example, a document and/or file to be printed. As such, data 236 forms a print job for fluid ejection system 200 and includes at least one print job command and/or command parameter.

In one example, electronic controller 230 provides control of printhead assembly 204 including timing control for ejection of ink drops from nozzles 214. As such, electronic controller 230 defines a pattern of ejected ink drops which form characters, symbols, and/or other graphics or images on print media 232. Timing control and, therefore, the pattern of ejected ink drops, is determined by the print job commands and/or command parameters. In one example, logic and drive circuitry forming a portion of electronic controller 230 is located on printhead assembly 204. In another example, logic and drive circuitry forming a portion of electronic controller 230 is located off printhead assembly 204. In another example, logic and drive circuitry forming a portion of electronic controller 230 is located off printhead assembly 204. In one example, data segments 100 and fire pulse signals, FS, such as illustrated previously herein by FIGS. 4, 7, and 8, for example, may be provided to print component 20 (e.g., fluidic die 30) by electronic controller 230, where electronic controller 230 may be remote from print component 20.

Figure 11:
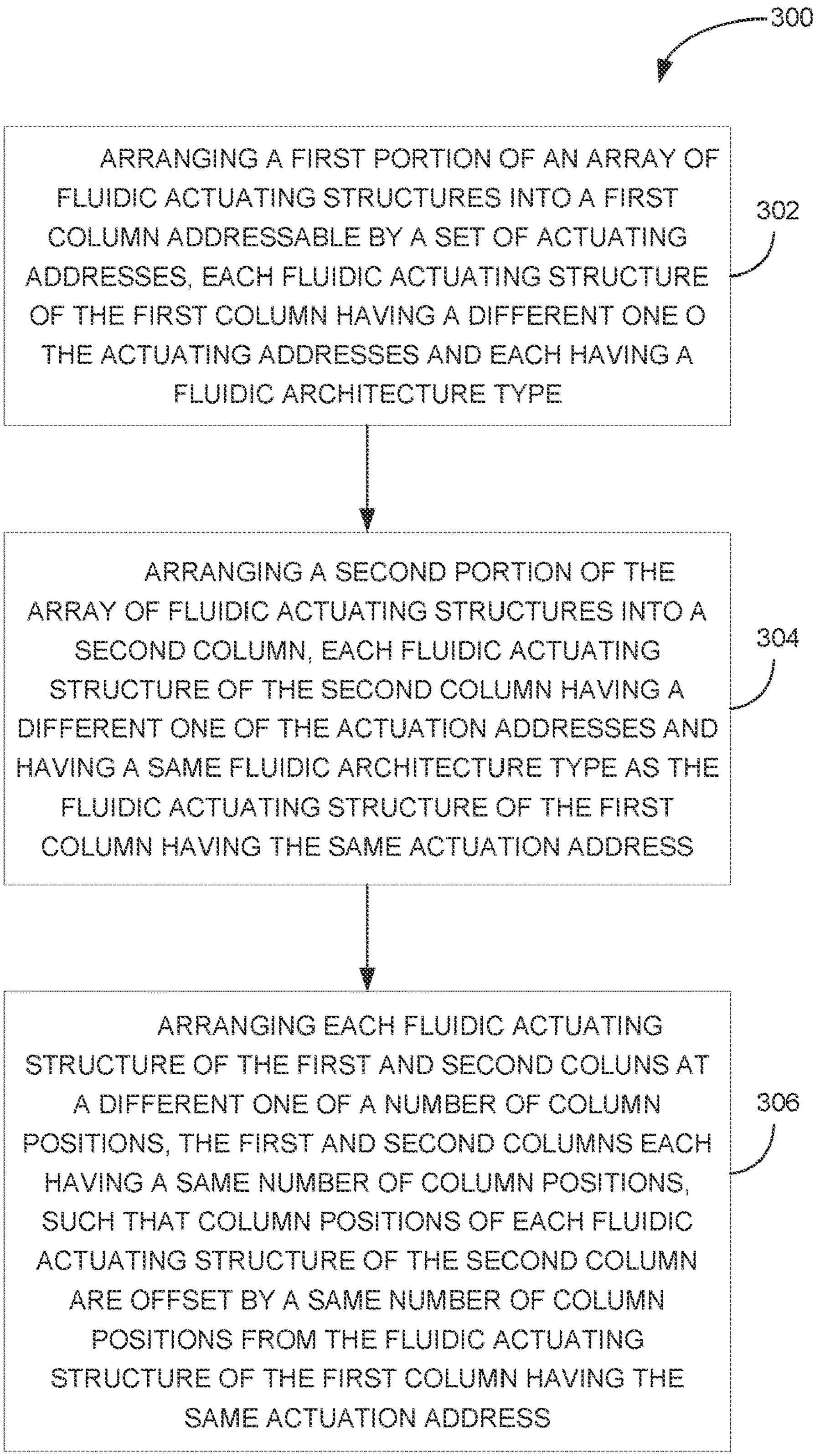
FIG. 11 is a flow diagram illustrating a method of operating a print component, according to one example.

FIG. 11 is a flow diagram illustrating a method 300 of operating a print component, such as print component 20 of FIG. 1. At 302, method 300 includes arranging a first portion of an array of fluidic actuating structures into a first column addressable by a set of actuating addresses, each fluidic actuating structure of the first column having a different one of the actuation addresses and having a fluidic architecture type, such as fluidic actuating structures FAS(1) to FAS(8) of column 33L, each having a different actuation address of a set of actuation address A1 to A8 and having one of two fluidic architectures type AT(1) and AT(2), as illustrated by FIG. 3.

At 304, method 300 includes arranging a second portion of the array of fluid actuation structures into a second column, each fluidic actuating structure of the second column having a different one of the actuation addresses and having a same fluidic architecture type as the fluidic actuating structure of the first column having the same address, such as fluidic actuating structures FAS(1) to FAS(8) of column 33R, each having a different actuation address of the set of actuation addresses A1 to A8, and each having a same fluidic architecture type, AT(1) or AT(2), as the fluidic actuating structures FAS(1) to FAS(8) having the same actuation address in column 33L, as illustrated by FIG. 3.

At 306, method 300 includes arranging each fluidic actuating structure of the first and second columns at a different one of a number of column positions, the first and second columns each having a same number of column positions, such that the column positions of each fluidic actuating structure of the second column are offset by a same number column positions from the fluidic actuating structure of the first column having the same actuation address, such as fluidic actuating structures FAS(1) to FAS(8) of columns 33L and 33R each being at a different one of the column positions CP(1) to CP(8), with each of the fluidic actuating structures FAS(1) to FAS(8) of column 33R being offset by four column positions from the fluid actuating structure of column 33L having the same actuation address, as illustrated by FIG. 3.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A fluidic circuit comprising:
 a plurality of fluidic actuation structures on a substrate, the plurality of fluidic actuation structures comprising:
  a first set of fluidic actuation structures; and
  a second set of fluidic actuation structures, the first set of fluidic actuation structures and the second set of fluidic actuation structures having respective column positions;
 wherein each fluidic actuation structure in the first set of fluidic actuation structures and in the second set of fluidic actuation structures is addressable by an actuation address from a set of actuation addresses;
 wherein the each fluidic actuation structure in the first set of fluidic actuation structures has a same actuation address as another fluidic actuation structure in the second set of fluidic actuation structures;
 wherein a location along a column of the another fluidic actuation structure in the second set of fluidic actuation structures that has the same actuation address as the each fluidic actuation structure in the first set of fluidic actuation structures is offset relative to the location of the each fluidic actuation structure in the first set of fluidic actuation structures; and
 wherein an address encoder is configured to drive the set of actuation addresses onto an address bus associated with the plurality of fluidic actuation structures.

2. The fluidic circuit of claim 1, wherein the first set of fluidic actuation structures forms a first primitive and the second set of fluidic actuation structures forms a second primitive, wherein the address bus is shared by the first primitive and the second primitive, and wherein the set of actuation addresses is communicated to the first primitive and the second primitive, respectively, via the address bus shared by the first primitive and the second primitive.

3. The fluidic circuit of claim 1, further comprising:
 a data terminal to receive data segments;
 a first plurality of memory elements corresponding to an address encoder, the first plurality of memory elements to receive address bits of the data segments; and
 a second plurality of memory elements, each of the second plurality of memory elements corresponding to a respective one of the first set of fluidic actuation structures and second set of fluidic actuation structures, the second plurality of memory elements to receive actuation data bits of the data segments.

4. The fluidic circuit of claim 1, further comprising a plurality of fluid feed holes along which the plurality of fluid actuation structures are arranged, wherein relative locations of the first set of fluidic actuation structures and the second set of fluidic actuation structures having the same address have a different position along the plurality of fluid feed holes.

5. The fluidic circuit of claim 1, wherein the another fluidic actuation structure in the second set of fluidic actuation structures that has the same address as the each fluidic actuation structure in the first set of fluidic actuation structures have a same fluidic architecture type.

6. The fluidic circuit of claim 1, wherein a first subset of fluidic actuation structures in the first set of fluidic actuation structures and the second set of fluidic actuation structures has a first fluidic architecture type and a second subset of fluidic actuation structures in the first set of fluidic actuation structures and the second set of fluidic actuation structures has a second fluidic architecture type, the first fluidic architecture type and second fluidic architecture type being different.

7. The fluidic circuit of claim 6, wherein the first fluidic architecture type and the second fluidic architecture type differ in at least one of a dimension of a nozzle orifice, a dimension of a fluid ejection chamber, or a dimension of a fluid actuator.

8. The fluidic circuit of claim 1, wherein the first set of fluidic actuation structures forms a first primitive and the second set of fluidic actuation structures forms a second primitive, and wherein a first fluidic actuation structure from the first primitive and a second fluidic actuation structure from the second primitive are fired simultaneously.

9. The fluidic circuit of claim 1, wherein the first set of fluidic actuation structures and the second set of fluidic actuation structures have a same number of fluidic actuation structures, and wherein the value of the offset is determined by dividing the number by a number of different fluidic architecture types in the array of fluidic actuation structures.

10. The fluidic circuit of claim 1, wherein the first set of fluidic actuation structures and the second set of fluidic actuation structures have a same even number of fluidic actuation structures, and wherein the value of the offset is half of the even number.

11. The fluidic circuit of claim 1, wherein the each fluidic actuation structure in the first set of fluidic actuation structures and in the second set of fluidic actuation structures has a corresponding AND-gate to receive a fire pulse signal and the actuation address.

12. The fluidic circuit of claim 1, wherein the first set of fluidic actuation structures and the second set of fluidic actuation structures have a same number of fluidic actuation structures, and wherein the value of the offset is determined by dividing the number by a number of different fluidic architecture types in the array of fluidic actuation structures.

13. The fluidic circuit of claim 1, wherein the each fluidic actuation structure in the first set of fluidic actuation structures and in the second set of fluidic actuation structures comprises:

an address decoder to decode the actuation address; and an AND-gate to receive a fire pulse signal and the actuation address.

14. A fluidic circuit comprising:

a plurality of fluidic actuation structures on a substrate, the plurality of fluidic actuation structures comprising:

a first set of fluidic actuation structures; and a second set of fluidic actuation structures, the first set of fluidic actuation structures and the second set of fluidic actuation structures having respective column positions;

wherein each fluidic actuation structure in the first set of fluidic actuation structures and in the second set of fluidic actuation structures is addressable by an actuation address from a set of actuation addresses;

wherein the each fluidic actuation structure in the first set of fluidic actuation structures has a same actuation address as another fluidic actuation structure in the second set of fluidic actuation structures;

wherein a location along a column of the another fluidic actuation structure in the second set of fluidic actuation structures that has the same actuation address as the each fluidic actuation structure in the first set of fluidic actuation structures is offset relative to the location of the each fluidic actuation structure in the first set of fluidic actuation structures;

wherein the first set of fluidic actuation structures forms a first primitive and the second set of fluidic actuation structures forms a second primitive;

wherein an address bus is shared by the first primitive and the second primitive; and wherein the set of actuation addresses is communicated to the first primitive and the second primitive, respectively, via the address bus shared by the first primitive and the second primitive.

15. The fluidic circuit of claim 14, further comprising:

a data terminal to receive data segments;

a first plurality of memory elements corresponding to an address encoder, the first plurality of memory elements to receive address bits of the data segments; and a second plurality of memory elements, each of the second plurality of memory elements corresponding to a respective one of the first set of fluidic actuation structures and second set of fluidic actuation structures, the second plurality of memory elements to receive actuation data bits of the data segments.

16. The fluidic circuit of claim 14, wherein a first subset of fluidic actuation structures in the first set of fluidic actuation structures and the second set of fluidic actuation structures has a first fluidic architecture type and a second subset of fluidic actuation structures in the first set of fluidic actuation structures and the second set of fluidic actuation structures has a second fluidic architecture type, the first fluidic architecture type and second fluidic architecture type being different, and wherein the first fluidic architecture type and the second fluidic architecture type differ in at least one of a dimension of a nozzle orifice, a dimension of a fluid ejection chamber, or a dimension of a fluid actuator.

17. The fluidic circuit of claim 14, wherein a first fluidic actuation structure from the first primitive and a second fluidic actuation structure from the second primitive are fired simultaneously, and wherein the actuation address of the first fluidic actuation structure and the second fluidic actuation structure is communicated to the first primitive and the second primitive, respectively, via the address bus shared by the first primitive and the second primitive.

18. A printhead comprising:

a substrate comprising:

a plurality of fluidic actuation structures comprising:

a first set of fluidic actuation structures; and a second set of fluidic actuation structures, the first set of fluidic actuation structures and the second set of fluidic actuation structures having respective column positions, wherein each fluidic actuation structure in the first set of fluidic actuation structures and in the second set of fluidic actuation structures is addressable by an actuation address from a set of actuation addresses;

wherein the each fluidic actuation structure in the first set of fluidic actuation structures has a same actuation address as another fluidic actuation structure in the second set of fluidic actuation structures;

wherein a location along a column of the another fluidic actuation structure in the second set of fluidic actuation structures that has the same actuation address as the each fluidic actuation structure in the first set of fluidic actuation structures is offset relative to the location of the each fluidic actuation structure in the first set of fluidic actuation structures; and wherein an address encoder is configured to drive the set of actuation addresses onto an address bus associated with the plurality of fluidic actuation structures.

19. The printhead of claim 18, further comprising an address bus to communicate the set of actuation addresses to the plurality of fluidic actuation structures.

20. The printhead of claim 19, further comprising a plurality of fluid feed holes along which the plurality of fluid actuation structures are arranged, wherein relative locations of the first set of fluidic actuation structures and the second set of fluidic actuation structures having the same address have a different position along the plurality of fluid feed holes.

* * * * *